R. G. SWANSON.
DEPERICARPING MACHINE.
APPLICATION FILED NOV. 22, 1913.

1,085,068.

Patented Jan. 20, 1914.

2 SHEETS—SHEET 1.

Witnesses:—

Inventor:—
Robert Gair Swanson,
By:—

R. G. SWANSON.
DEPERICARPING MACHINE.
APPLICATION FILED NOV. 22, 1913.

1,085,068.

Patented Jan. 20, 1914.

2 SHEETS—SHEET 2.

Witnesses:—
H. T. P. Gee
Voltas W. Ward

Inventor:—
Robert Gair Swanson.
By:— Spear, Middleton, Donaldson & Spear
Attys

UNITED STATES PATENT OFFICE.

ROBERT GAIR SWANSON, OF LONDON, ENGLAND.

DEPERICARPING-MACHINE.

1,085,068.  Specification of Letters Patent.  Patented Jan. 20, 1914.

Application filed November 22, 1913. Serial No. 802,493.

*To all whom it may concern:*

Be it known that I, ROBERT GAIR SWANSON, subject of George V, King of Great Britain and Ireland, and resident of 31 Regina road, Ealing, London, W., England, have invented certain new and useful improvements in depericarping-machines for the depericarping of drupaceous and other fruits for the production of vegetable oils and applicable also to other purposes.

This invention chiefly relates to depericarping of drupaceous fruits such as palm nuts and olives whereby the whole of the pericarp or outer portion of the fruit is mechanically removed from the inner portion thereof. By this invention the method of treating the fruit is simplified.

In order that this invention may be easily understood and readily carried into effect I will proceed to describe the same with reference to the accompanying drawings, wherein—

Figure 1:
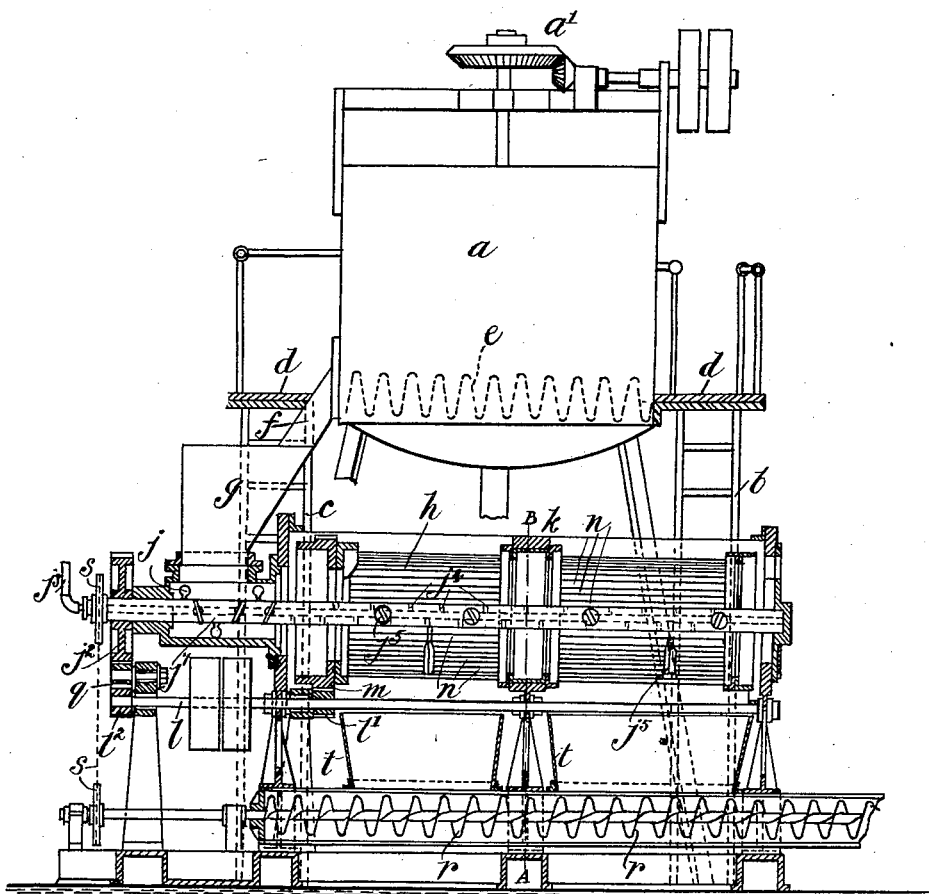
Figure 2:
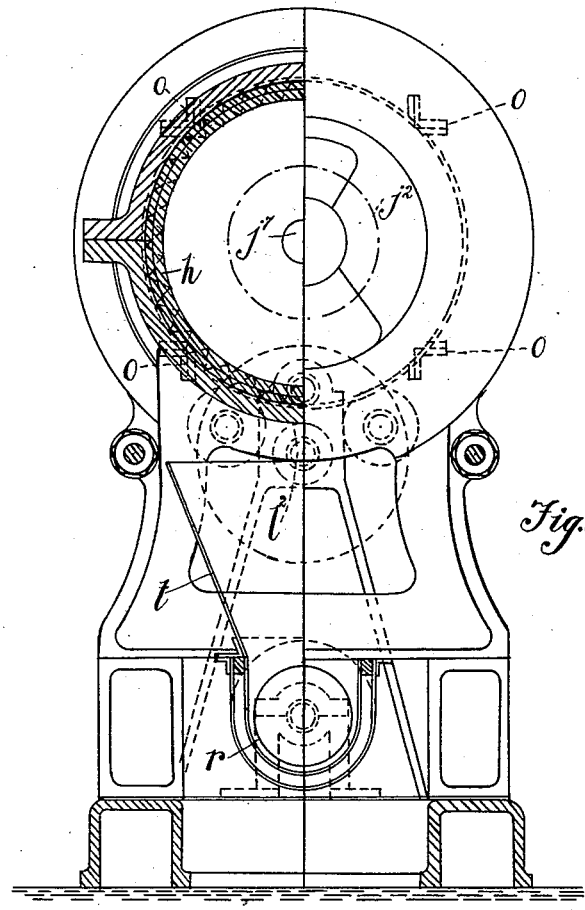
Figure 3:
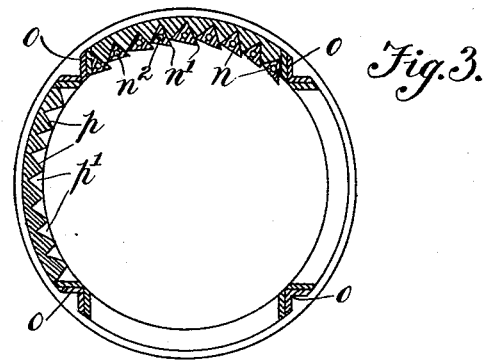

Figure 1 is a longitudinal section, partly in elevation, of a depericarping machine constructed according to this invention. Fig. 2 is a half section on line A—B of Fig. 1 and half end elevation of the said machine. Fig. 3 is a cross-section of the cylinder looking from the delivery end of the machine and illustrates a cage hereinafter referred to for holding the knives and illustrates also a set of knives arranged in the cage.

Referring to Fig. 1 of the drawings, in carrying out this invention there is provided a cooking pan $a$, suitably jacketed to retain the heat of the steam used for cooking the fruit or vegetable with which the pan is charged. The pan may be fed by hand, for which purpose ladders $b$, $c$, are provided for the attendants to pass to and from a platform $d$, from which latter the material is fed into the pan. The fruit or vegetables are suitably agitated as by power-driven agitators of which the driving gear is shown at $a'$. The cooked fruit or vegetables are carried by a spiral screw conveyer $e$ or by any other suitable means to the exit, indicated at $f$, of the pan from whence it drops into a hopper $g$ and is then carried into the cylinder $h$ by the blades $j$, $j$ fitted on the hollow shaft $j'$ which is rotated in the manner hereinafter described. The cylinder is supported at its ends in suitable bearings and at its middle by an additional bearing $k$. It is driven from a shaft $l$ through a pinion $l'$ and toothed wheel $m$ which latter forms part of the frame-work of the cylinder.

The internal surface of the cylinder consists of a series of knives $n$, shown more clearly in Figs. 2 and 3, to which figures reference will now be had. The knives are of angular—preferably triangular—cross-section, as illustrated in the figures, presenting sharpened edges $n'$. They are arranged longitudinally of the cylinder and are supported in the following manner. Extending lengthwise of the cylinder are four angle-iron bars $o$ and fixed between said angle-iron bars $o$ are four bars $p$ of arcuate which together make up the circle of the cylinder and which, along with the angle-iron bars, constitute what is conveniently termed a "cage." Each of the arc-bars $p$ has a series of V-shaped recesses $p'$ formed in it, the formation of the recesses being such that, when the knives are bedded in them, one edge $n'$ of the knives projects in the manner clearly shown at the upper part of Fig. 3. The ends of the knives are turned down so as to leave projecting pins $n^2$. These pins are mounted in plates which are fitted into sunk or recessed portions of the arc-bars $p$ whereto they are fixed by set-screws or by other suitable means.

Referring again to Fig. 1 of the drawings, the hollow shaft $j'$ is independent of and is arranged to revolve in the opposite direction to the cylinder by means of a pinion $l^2$ fixed on the shaft $l$, intermediate toothed wheels $q$ fixed on a stationary spindle, and toothed wheel $j^2$ fixed on the hollow shaft $j'$. Steam is admitted into the hollow shaft through a pipe $j^3$ and issues into the cylinder through perforations $j^4$, $j^4$, provided in the hollow shaft. The latter is also furnished with beaters $j^5$, $j^5$, set at such an angle as to convey the fruit longitudinally against the knives of the cylinder entirely separating the pericarp or outer portion of the fruit from the inner portion or nut, both the latter and any pericarp there may be in the cylinder then passing through an aperture at the delivery end of the cylinder for mechanical separation.

As the cylinder rotates, it tends to carry the fruit up with it on the ascending side until the action of gravity causes it to reverse its movement and thus the knives $n$ throughout the entire circumference of the cylinder successively exert a cutting action to remove the pulp from the stones or seeds, the fruit being gradually moved endwise of the cylinder by the inclination of the blades or stirrers which also stir or agitate the fruit to assist in causing fresh portions thereof to be subjected to the cutting action of the knives.

The oil, etc., passing between the knives falls into a jacketed conveyer $r$ driven by chain gearing $s$ from the shaft $j'$, guards being provided for preventing any oil etc. passing outside the conveyer.

There may, if desired, be more than one cylinder.

Any suitable fruit may be treated as above described for the production of vegetable oils and other purposes.

I claim:

1. In a machine for depericarping drupaceous and other fruits, the combination of a hollow perforated shaft, means for supporting and means for rotating said shaft, a cylinder arranged around said shaft consisting of a plurality of triangular cutters supported by the interior periphery of the cylinder and having cutting edges projecting inwardly, means for removably mounting said cutters in said cylinder, means for rotating said cylinder, means for conducting the fruit or the like to said shaft, blades upon said shaft for propelling the fruit or the like into said cylinder, and beaters upon said shaft for agitating and propelling the fruit or the like through said cylinder.

2. In combination in a fruit depericarping machine, a cylinder having a plurality of cutters triangular in cross section, means for supporting said cutters comprising bars extending longitudinally of the machine, arcuate bars fixed between said first-mentioned bars and provided with angular recesses, said cutters fitted to said recesses so as to extend inwardly and having one edge protruding from the supporting surface to perform the cutting action, said cutting edge being to one side of the central line thereof and rotating means for the cylinder.

In witness whereof I have hereunto set my hand in the presence of two witnesses.

ROBERT GAIR SWANSON.

Witnesses:
H. T. P. GEE,
H. D. JAMISON.

---

Copies of this patent may be obtained for five cents each, by addressing the "Commissioner of Patents, Washington, D. C."